(12) United States Patent
Lei et al.

(10) Patent No.: US 11,470,562 B2
(45) Date of Patent: Oct. 11, 2022

(54) POWER CONTROL CONSIDERATIONS FOR SMALL DATA TRANSFER

(71) Applicant: QUALCOMM Incorporated, San Diego, CA (US)

(72) Inventors: Jing Lei, San Diego, CA (US); Wanshi Chen, San Diego, CA (US); Linhai He, San Diego, CA (US); Ruiming Zheng, Beijing (CN); Alexandros Manolakos, Escondido, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/652,870

(22) Filed: Feb. 28, 2022

(65) Prior Publication Data
US 2022/0182949 A1    Jun. 9, 2022

Related U.S. Application Data

(63) Continuation of application No. PCT/CN2020/110339, filed on Aug. 20, 2020.

(51) Int. Cl.
*H04W 52/32* (2009.01)
*H04W 52/36* (2009.01)
*H04W 74/08* (2009.01)

(52) U.S. Cl.
CPC ....... *H04W 52/325* (2013.01); *H04W 52/365* (2013.01); *H04W 74/0833* (2013.01)

(58) Field of Classification Search
CPC ............. H04W 52/325; H04W 52/365; H04W 74/0833
USPC ........................................................ 455/522
See application file for complete search history.

(56) References Cited

U.S. PATENT DOCUMENTS

2018/0279376 A1\* 9/2018 Dinan ................... H04W 52/50
2020/0137695 A1  4/2020 Papasakellariou

FOREIGN PATENT DOCUMENTS

WO     2020150658 A1    7/2020

OTHER PUBLICATIONS

International Search Report and Written Opinion—PCT/CN2020/110339—ISA/EPO—dated May 25, 2021.
Nokia, et al., "2-Step RACH Procedure Feature Lead Summary", 3GPP Draft, 3GPP TSG RAN WG1 #96bis, R1-1905764 2-Step Rach Procedure Feature Lead Summary RAN1#96B, 3rd Generation Partnership Project (3GPP), Mobile Competence Centre, 650, Route Des Lucioles F-06921, Sophia-Antipolis, Cedex, vol. RAN WG1, No. Xi'an, China, Apr. 8, 2019-Apr. 12, 2019, Apr. 15, 2019 (Apr. 15, 2019), XP051707820, pp. 1-94.

\* cited by examiner

*Primary Examiner* — Shaima Q Aminzay
(74) *Attorney, Agent, or Firm* — Patterson+ Sheridan, L.L.P.

(57) ABSTRACT

Certain aspects of the present disclosure provide techniques for controlling power for small data transfer (SDT).

30 Claims, 15 Drawing Sheets

POWER CONTROL CONSIDERATIONS FOR SMALL DATA TRANSFER

CROSS-REFERENCE TO RELATED APPLICATION

This application is a continuation of PCT Application No. PCT/CN2020/110339, filed Aug. 20, 2020, which is hereby incorporated by reference in its entirety.

BACKGROUND

Field of the Disclosure

Aspects of the present disclosure relate to wireless communications, and more particularly, to power control considerations for small data transfer (SDT).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure may provide advantages, such as improved energy efficiency spectral efficiency.

Certain aspects provide a method for wireless communication by a user equipment (UE). The method generally includes determining one or more power control parameters to use for an initial small data transfer (SDT) transmission and, in the event the SDT transmission fails, an SDT retransmission, and transmitting the SDT is attempted, based on a random access channel (RACH) procedure or a preconfigured uplink resource (PUR) procedure, in accordance with the determined power control parameters and power ramping procedures.

Certain aspects provide a method for wireless communication by a network entity. The method generally includes transmitting signaling, to a UE, indicating of one or more power control parameters to use for an initial SDT transmission and, in the event the SDT transmission fails, an SDT retransmission is attempted, and receiving the SDT, based on a RACH procedure or a PUR procedure, in accordance with the one or more power control parameters and power ramping procedures.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
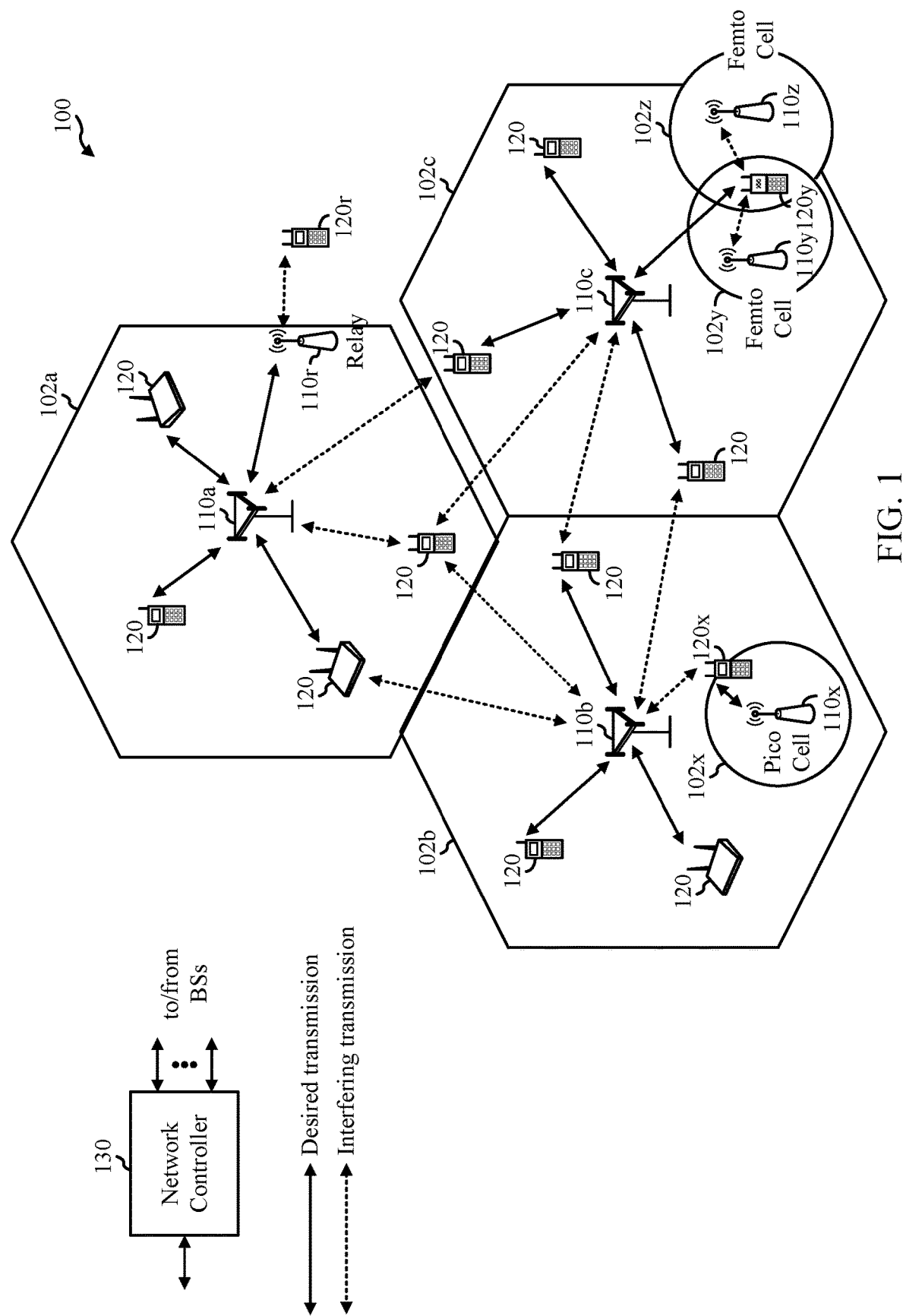
FIG. 1 is a block diagram conceptually illustrating an example telecommunications system, in accordance with certain aspects of the present disclosure.

Aspects of the present disclosure relate to wireless communications, and more particularly, to techniques for power control considerations for small data transfer (SDT).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a UE 120 may be configured to perform operations 1000 of FIG. 10 to control power for small data transfer (SDT), in accordance with various aspects discussed herein. Similarly, a base station 110 may be configured to perform operations 1100 of FIG. 11 to control power for SDT for a UE (e.g., performing operations 1000 of FIG. 10).

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
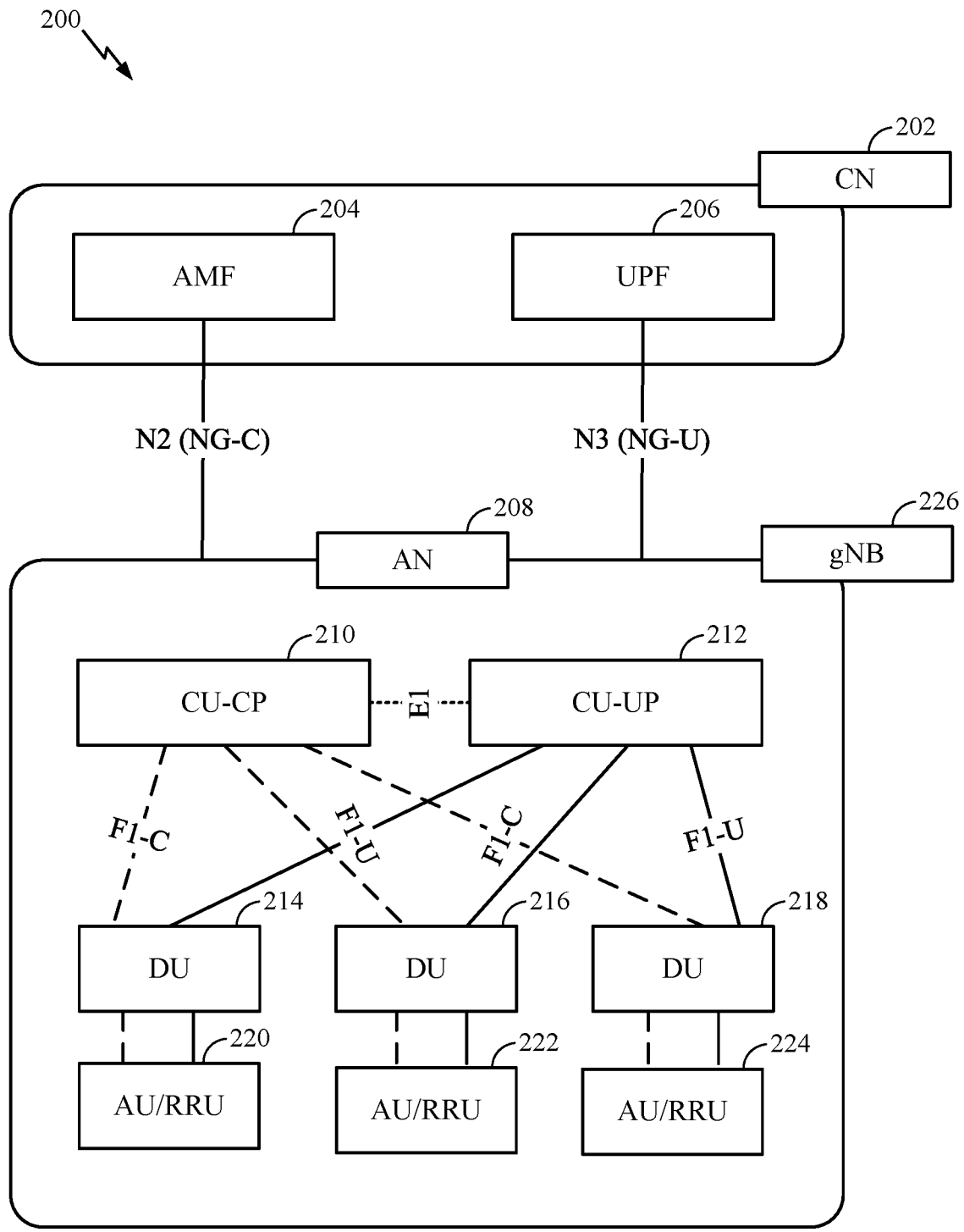
FIG. 2 is a block diagram illustrating an example architecture of a distributed radio access network (RAN), in accordance with certain aspects of the present disclosure.

FIG. 2 illustrates an example architecture of a distributed Radio Access Network (RAN) 200, which may be implemented in the wireless communication network 100 illustrated in FIG. 1. As shown in FIG. 2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 208 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE).

The CU-UP(s) 212 may be connected to the CU-CP 210. For example, the DU-UP(s) 212 and the CU-CP 210 may be connected via an E1 interface. The CU-CP(s) 212 may connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via an Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
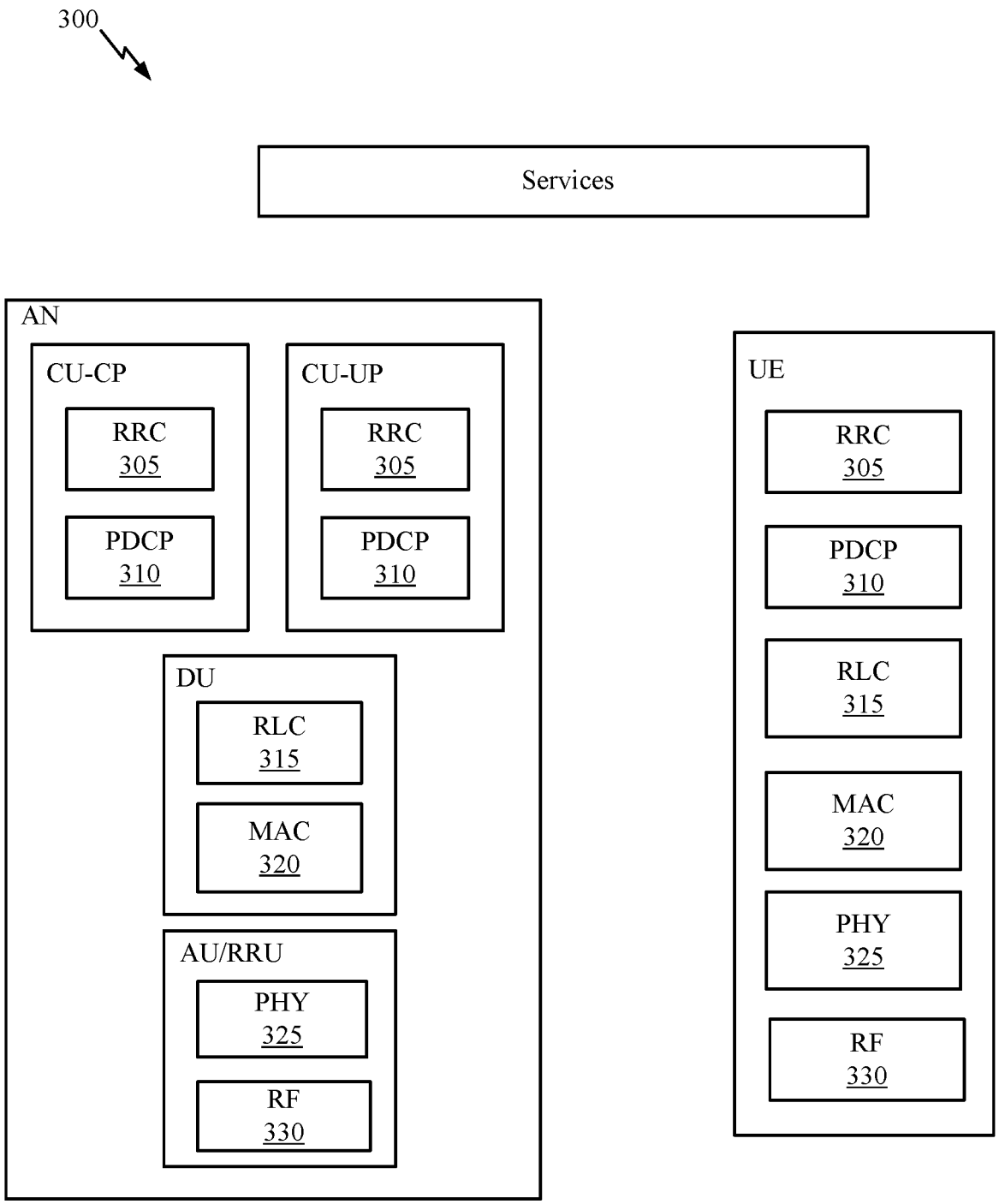
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
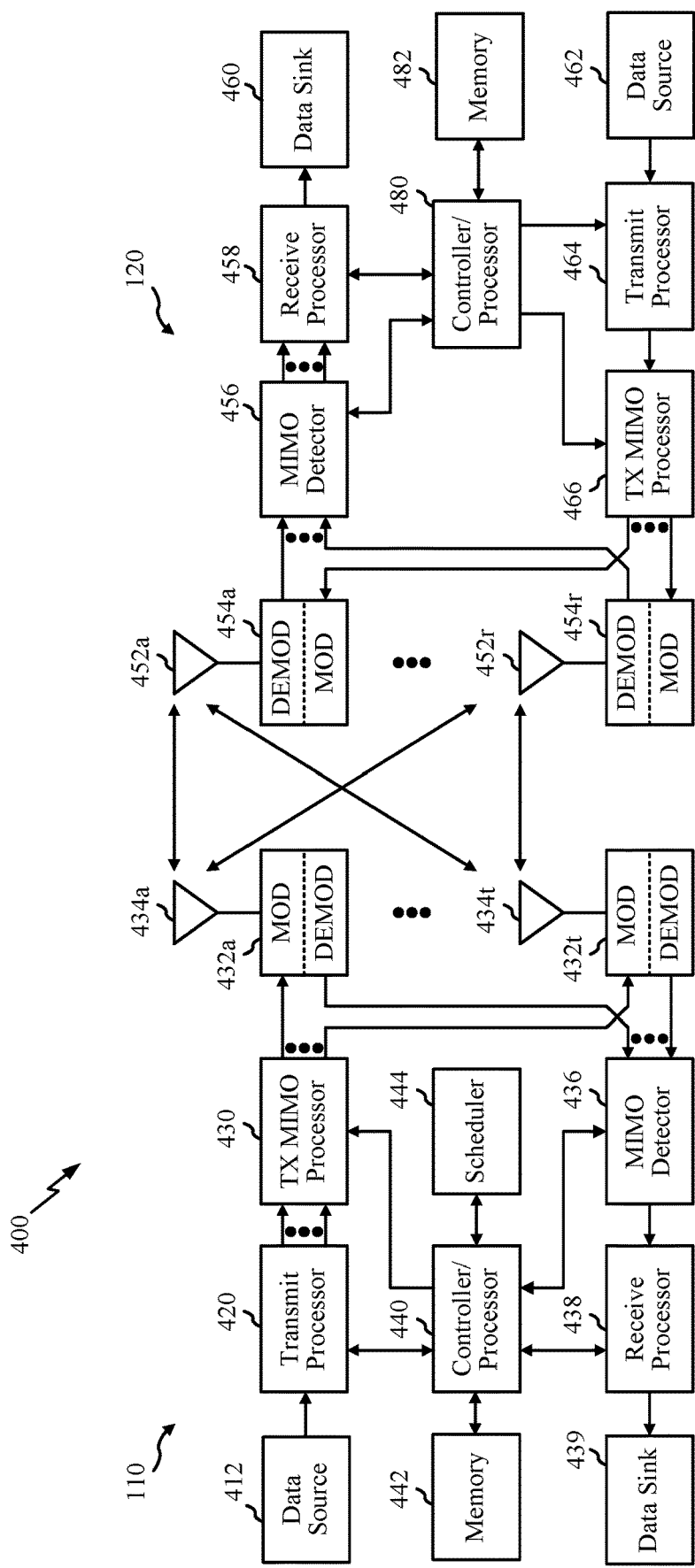
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be configured to perform the operations described with respect to FIG. 9, while similar processors of BS 110 may perform operations described with respect to FIG. 10.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
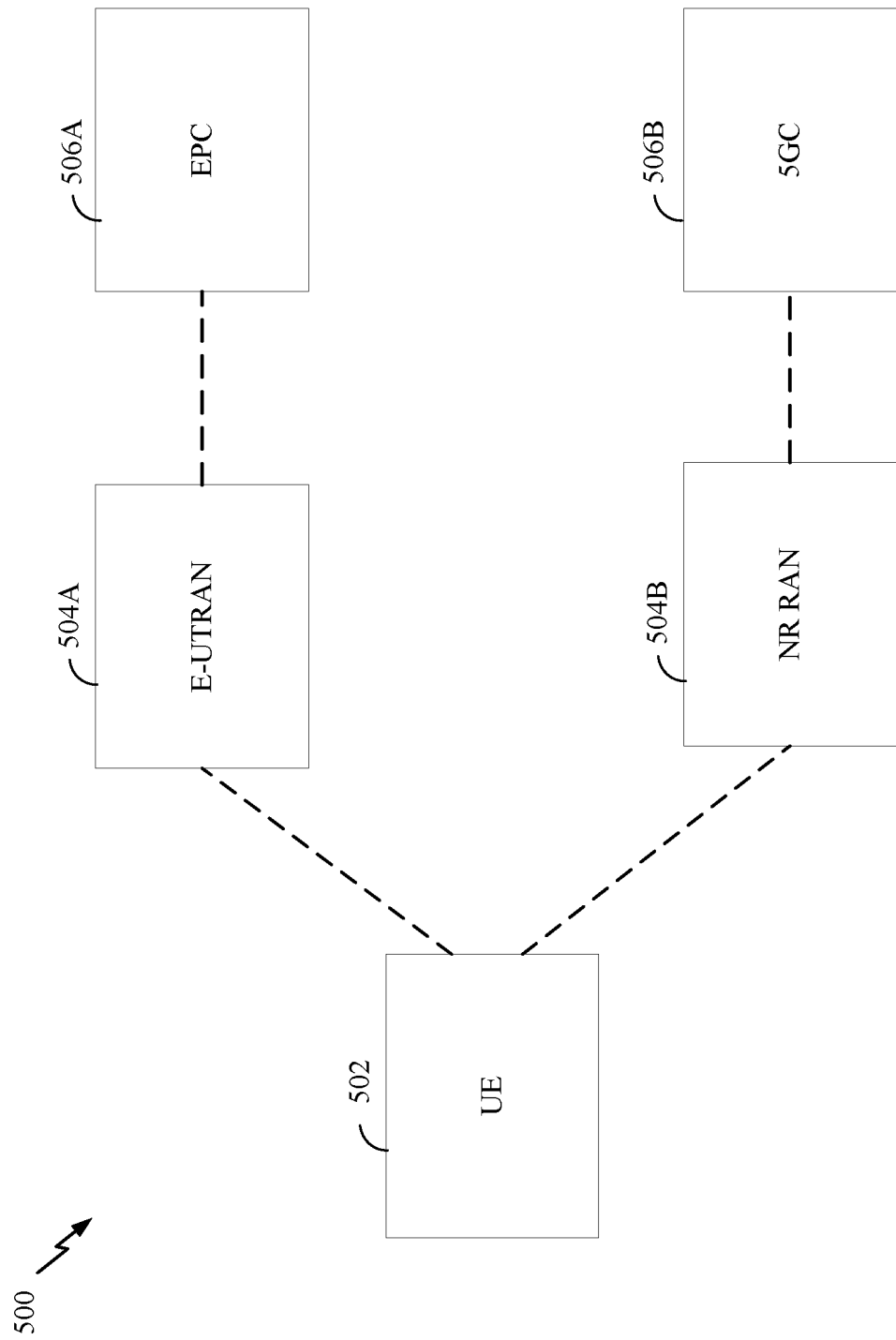
FIG. 5 illustrates an example system architecture for interworking between a 5G System (5GS) and an evolved universal mobile telecommunication system network (E-UTRAN) system, in accordance with certain aspects of the present disclosure.

FIG. 5 illustrates an example system architecture 500 for interworking between 5GS (e.g., such as the distributed RAN 200) and E-UTRAN-EPC, in accordance with certain aspects of the present disclosure. As shown in FIG. 5, the UE 502 may be served by separate RANs 504A and 504B controlled by separate core networks 506A and 506B, where the RAN 504A provides E-UTRA services and RAN 504B provides 5G NR services. The UE may operate under only one RAN/CN or both RANs/CNs at a time.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
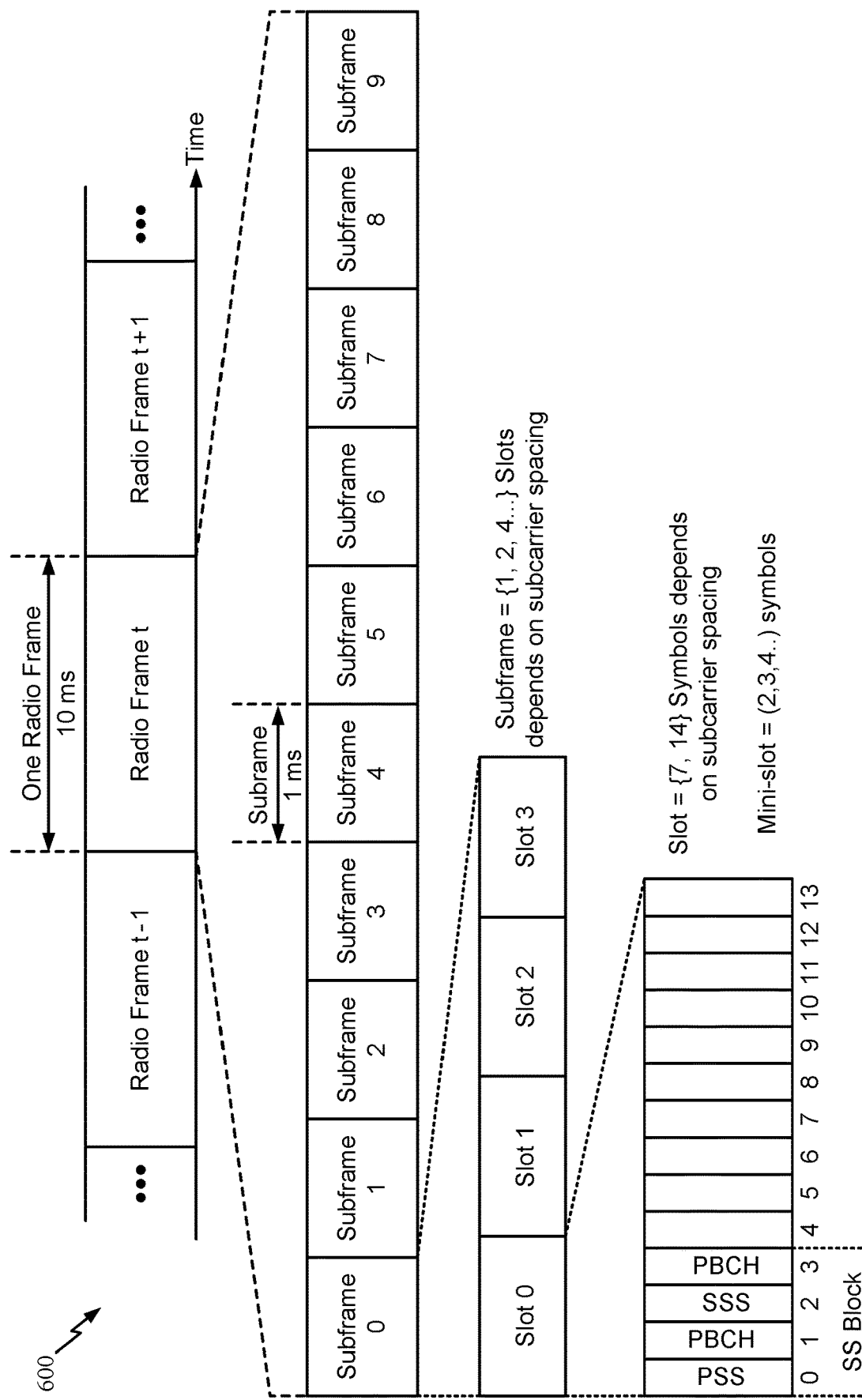
FIG. 6 illustrates an example of a frame format for a telecommunication system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example RACH Procedures

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 7:
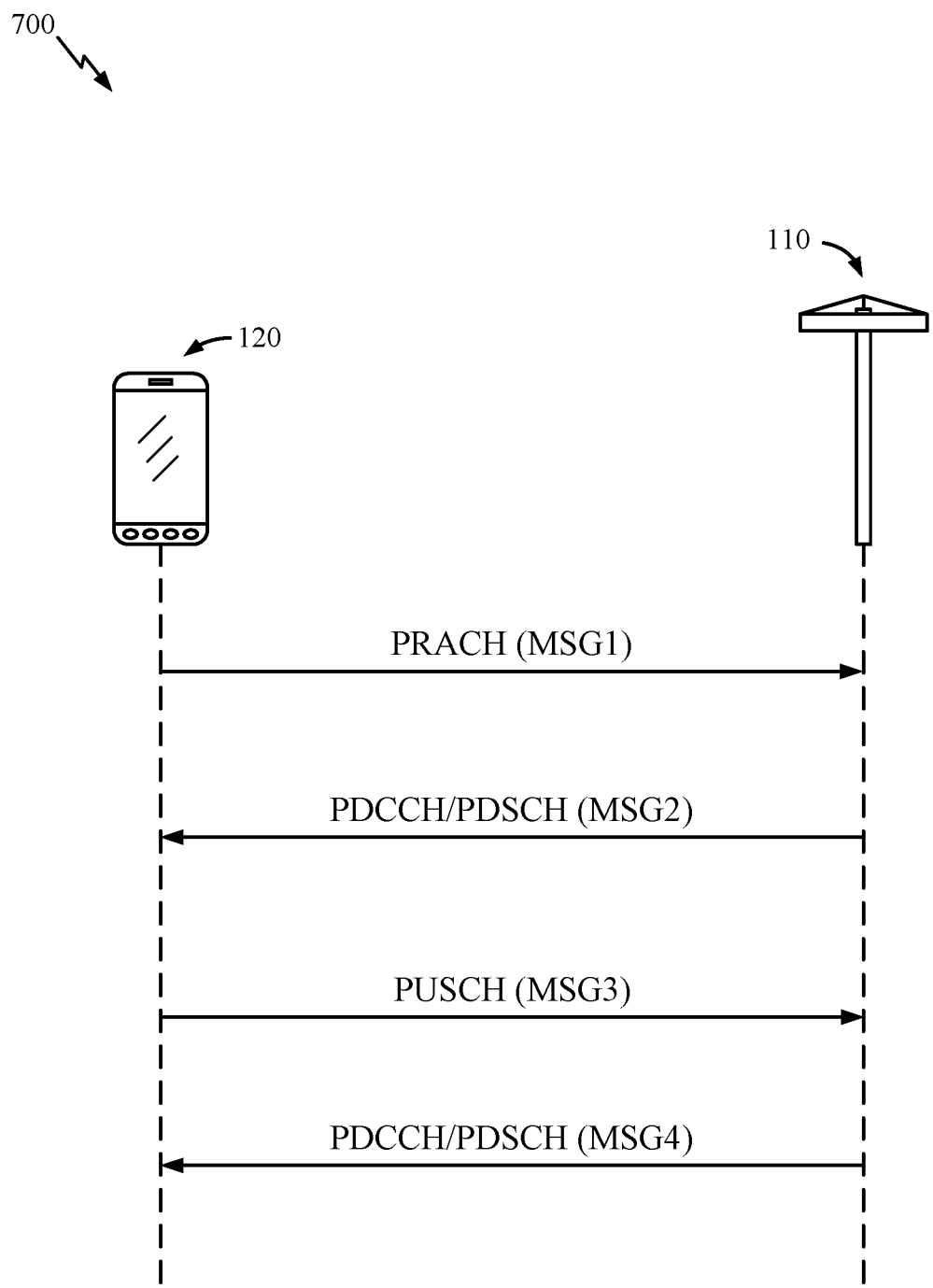
FIG. 7 is a timing diagram illustrating an example four-step RACH procedure, in accordance with certain aspects of the present disclosure.

FIG. 7 is a timing (or "call-flow") diagram 700 illustrating an example four-step RACH procedure, in accordance with certain aspects of the present disclosure. A first message (MSG1) may be sent from the UE 120 to BS 110 on the physical random access channel (PRACH). In this case, MSG1 may only include a RACH preamble. BS 110 may respond with a random access response (RAR) message (MSG2) which may include the identifier (ID) of the RACH preamble, a timing advance (TA), an uplink grant, cell radio network temporary identifier (C-RNTI), and a back off indicator. MSG2 may include a PDCCH communication including control information for a following communication on the PDSCH, as illustrated. In response to MSG2, MSG3 is transmitted from the UE 120 to BS 110 on the PUSCH. MSG3 may include one or more of a RRC connection request, a tracking area update request, a system information request, a positioning fix or positioning signal request, or a scheduling request. The BS 110 then responds with MSG 4 which may include a contention resolution message.

In some cases, to speed access, a two-step RACH procedure may be supported. As the name implies, the two-step RACH procedure may effectively "collapse" the four messages of the four-step RACH procedure into two messages.

Figure 8:
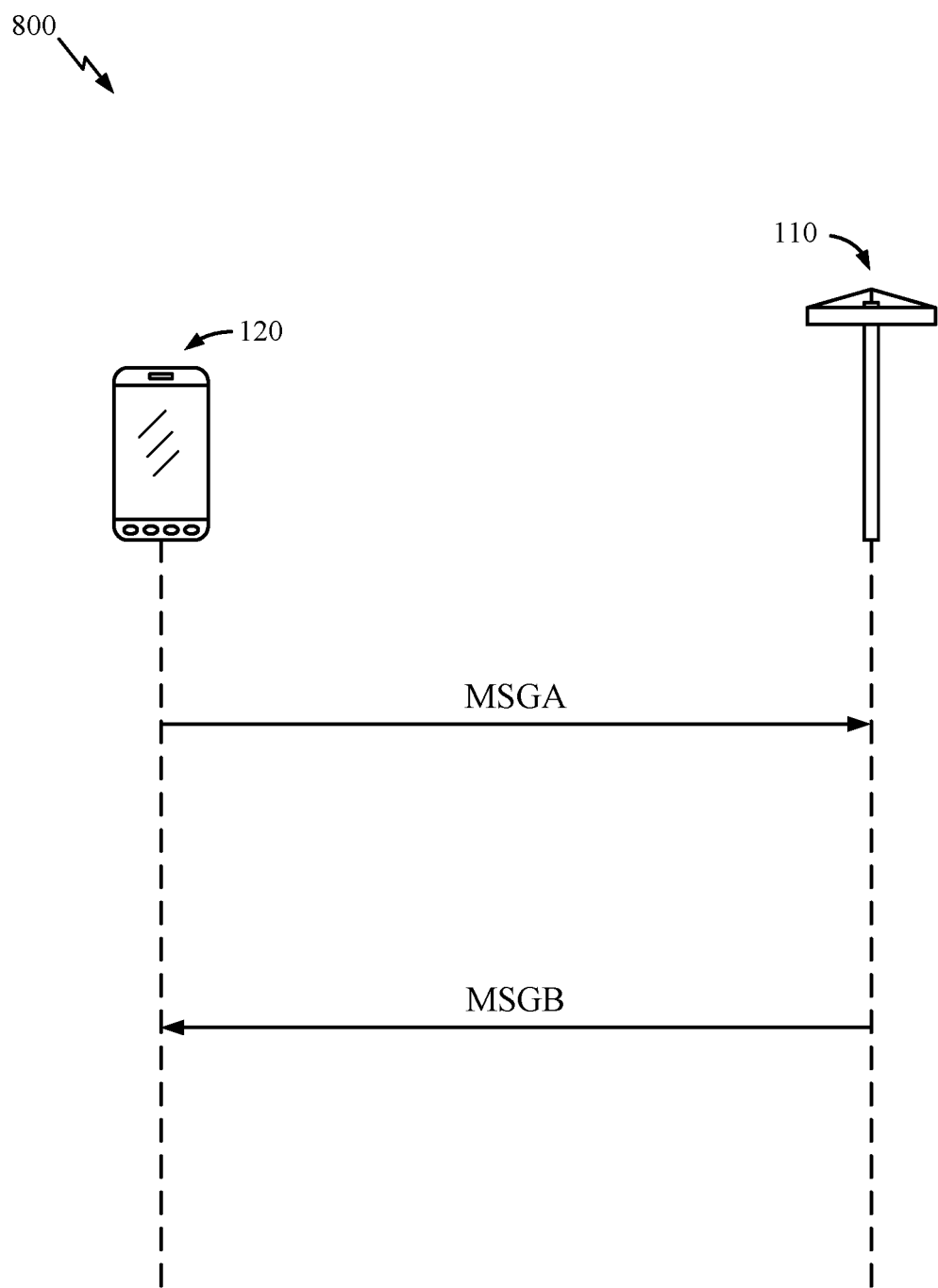
FIG. 8 is a timing diagram illustrating an example two-step RACH procedure, in accordance with certain aspects of the present disclosure.

FIG. 8 is a timing diagram 800 illustrating an example two-step RACH procedure, in accordance with certain aspects of the present disclosure. A first enhanced message (msgA) may be sent from the UE 120 to BS 110. In certain aspects, msgA includes some or all the information from MSG1 and MSG3 from the four-step RACH procedure, effectively combining MSG1 and MSG3. For example, msgA may include MSG1 and MSG3 multiplexed together such as using one of time-division multiplexing or frequency-division multiplexing. In certain aspects, msgA includes a RACH preamble for random access and a payload. The msgA payload, for example, may include the UE-ID and other signaling information (e.g., buffer status report (BSR)) or scheduling request (SR). BS 110 may respond with a random access response (RAR) message (msgB) which may effectively combine MSG2 and MSG4 described above. For example, msgB may include the ID of the RACH preamble, a timing advance (TA), a back off indicator, a contention resolution message, UL/DL grant, and transmit power control (TPC) commands.

In a two-step RACH procedure, the msgA may include a RACH preamble and a payload. In some cases, the RACH preamble and payload may be sent in a msgA transmission occasion.

The random access message (msgA) transmission occasion generally includes a msgA preamble occasion (for transmitting a preamble signal) and a msgA payload occasion for transmitting a PUSCH. The msgA preamble transmission generally involves:

(1) selection of a preamble sequence; and
  (2) selection of a preamble occasion in time/frequency domain (for transmitting the selected preamble sequence).

The msgA payload transmission generally involves:
  (1) construction of the random access message payload (DMRS/PUSCH); and (2) selection of one or multiple PUSCH resource units (PRUs) in time/frequency domain to transmit this message (payload).

In some cases, a UE monitors SSB transmissions which are sent (by a gNB using different beams) and are associated with a finite set of time/frequency resources defining RACH occasions (ROs) and PRUs. As will be described in greater detail below, upon detecting an SSB, the UE may select an RO and one or more PRUs associated with that SSB for a msgA transmission. The finite set of ROs and PRUs may help reduce monitoring overhead (blind decodes) by a base station.

There are several benefits to a two-step RACH procedure, such as speed of access and the ability to send a relatively small amount of data without the overhead of a full four-step RACH procedure to establish a connection (when the four-step RACH messages may be larger than the payload).

The two-step RACH procedure can operate in any RRC state and any supported cell size. Networks that uses two-step RACH procedures can typically support contention-based random access (CBRA) transmission of messages (e.g., msgA) within a finite range of payload sizes and with a finite number of MCS levels.

Various technologies may be the focus of current wireless communication standards. For example, Rel-15 and/or Rel-16 may focus on premium smartphones (e.g., enhanced mobile broadband (eMBB)), and other verticals such as ultra-reliable low latency communication (URLLC) and/or vehicle-to-everything (V2X) communications. In some wireless communication standards (e.g., Rel-17 and beyond) there may exists a strong desire for new radio (NR) to be scalable and deployable in a more efficient and cost-effective way. Thus, a new UE type with reduced capabilities (RedCap) has been introduced. In particular, a RedCap UE may exhibit a general relaxation of peak throughput, as well as lower latency and/or reliability requirements.

Figure 9:
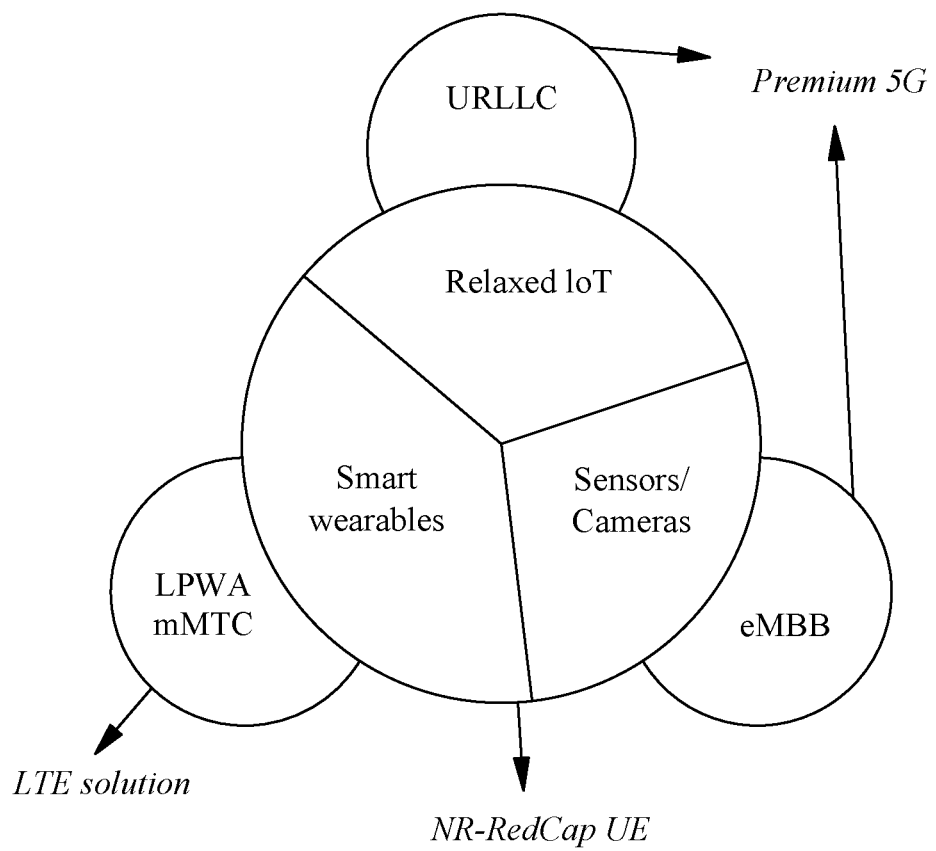
FIG. 9 is a diagram illustrating example functionality of reduced capability (RedCap) user equipments (UEs), in accordance with certain aspects of the present disclosure.

Thus, some design objectives of the NR RedCap UE may include scalable resource allocation, coverage enhancement for DL and/or UL, power saving in all RRC states, and/or co-existence with the NR premium UE. As shown in FIG. 9, an NR-RedCap UE may be a smart wearable device, a sensor/camera, or any other device configured for relaxed internet-of-things (IoT) communications. Further, a RedCap UE functionality and/or capability may overlap with those of long term evolution (LTE) and/or fifth generation (5G) devices (e.g., premium 5G devices). For example, the functionality of relaxed IoT devices may overlap with that of URLLC devices, the functionality of smart wearable devices may overlap with that of low power wide area (LPWA) massive machine type communication (mMTC) devices, and/or the functionality of sensors/cameras may overlap with that of eMBB devices.

Example Power Control Considerations for Small Data Transfer (SDT)

Aspects of the present disclosure provide techniques for applying power control to small data transfer (SDT) transmissions, for example, using various parameters to improve energy efficiency and spectral efficiency of SDT.

Currently, communication protocols (e.g., new radio (NR)) support an RRC INACTIVE state for UEs. UEs that have infrequent (e.g., periodic and/or aperiodic) data transmission are generally maintained by the network in the RRC INACTIVE state. Until relatively recently (e.g., NR Rel-16), the RRC INACTIVE state did not support uplink (UL) data transmission. In general, connection setup and subsequent release to an INACTIVE state happens for each data transmission, regardless of how small and/or infrequent the data packets are. This potentially results in a significant amount of unnecessary power consumption and signaling overhead.

More recent and further systems (e.g., NR Rel-17) may support a mechanism optimized for small payloads, referred to as small data transfer (SDT). SDT may be supported in various random access channel (RACH) schemes (e.g., 2-step RACH described above with reference to FIG. 8 and/or 4-step RACH described above with reference to FIG. 7), as well as in a pre-configured uplink resource (PUR, such as preconfigured PUSCH resources).

These RACH schemes can be performed by a UE in inactive/idle state, with or without a valid timing advance (TA). In some cases, PUR can be performed by a UE in a RRC inactive/idle state after a TA is validated. If a UE is configured with PUR resource, but fails the TA validation, the UE may fall back to a RACH procedure (e.g., a RACH scheme) to obtain a valid TA.

One potential challenge with SDT transmissions is power control for initial SDT transmission and, in the event of failure, SDT retransmissions.

Open-loop power control (OLPC) and/or closed-loop power control (CLPC) schemes may be applied to various communications with a network (e.g., physical random access channel (PRACH), sounding reference signal (SRS), physical uplink shared channel (PUSCH), and/or physical uplink control channel (PUCCH)) to mitigate intra-cell and/or inter-cell interference and reduce the UE's power consumption.

Figure 10:
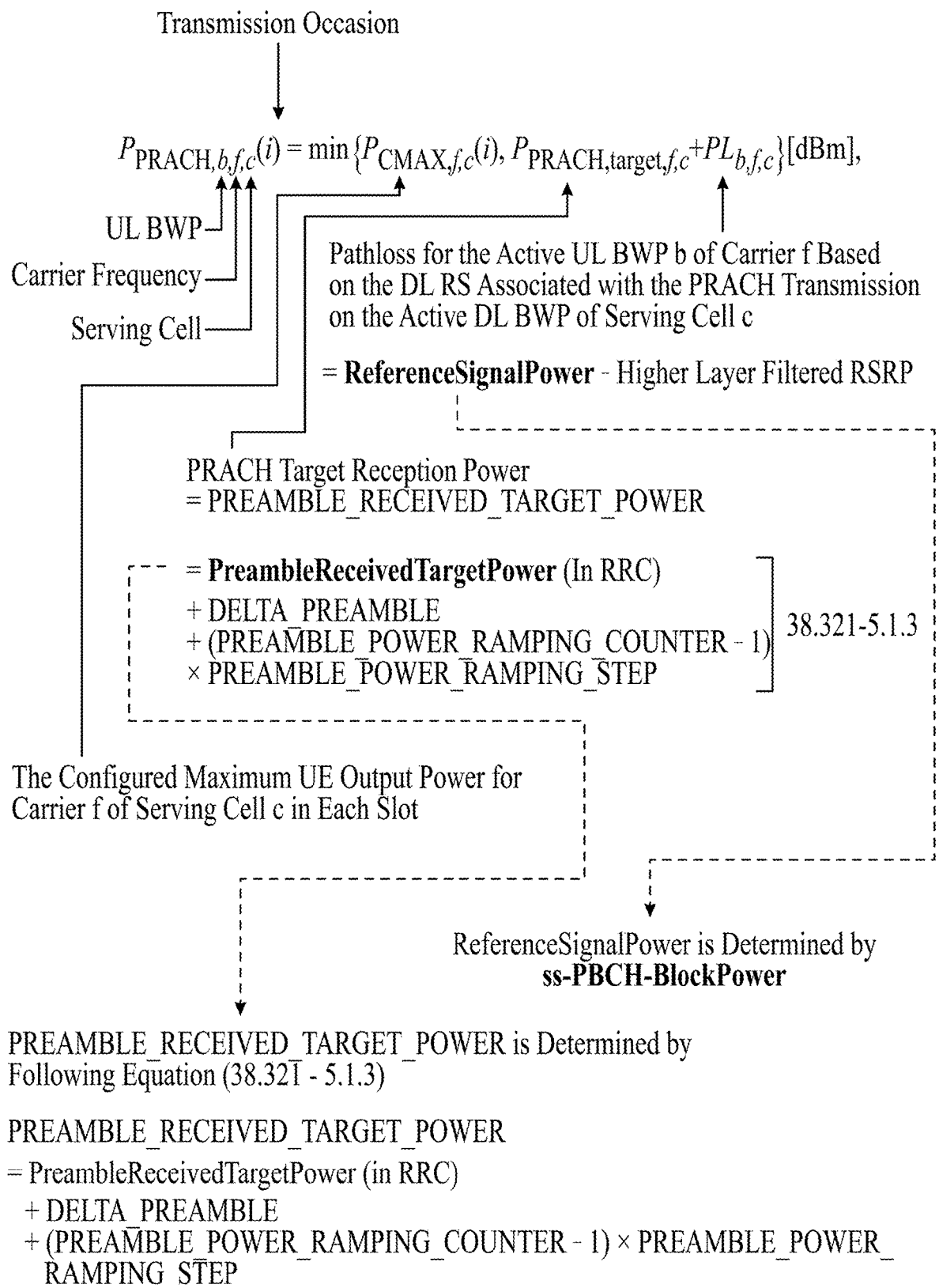
FIG. 10 is an example power control configuration equation for physical random access channel (PRACH), in accordance with certain aspects of the present disclosure.
Figure 11:
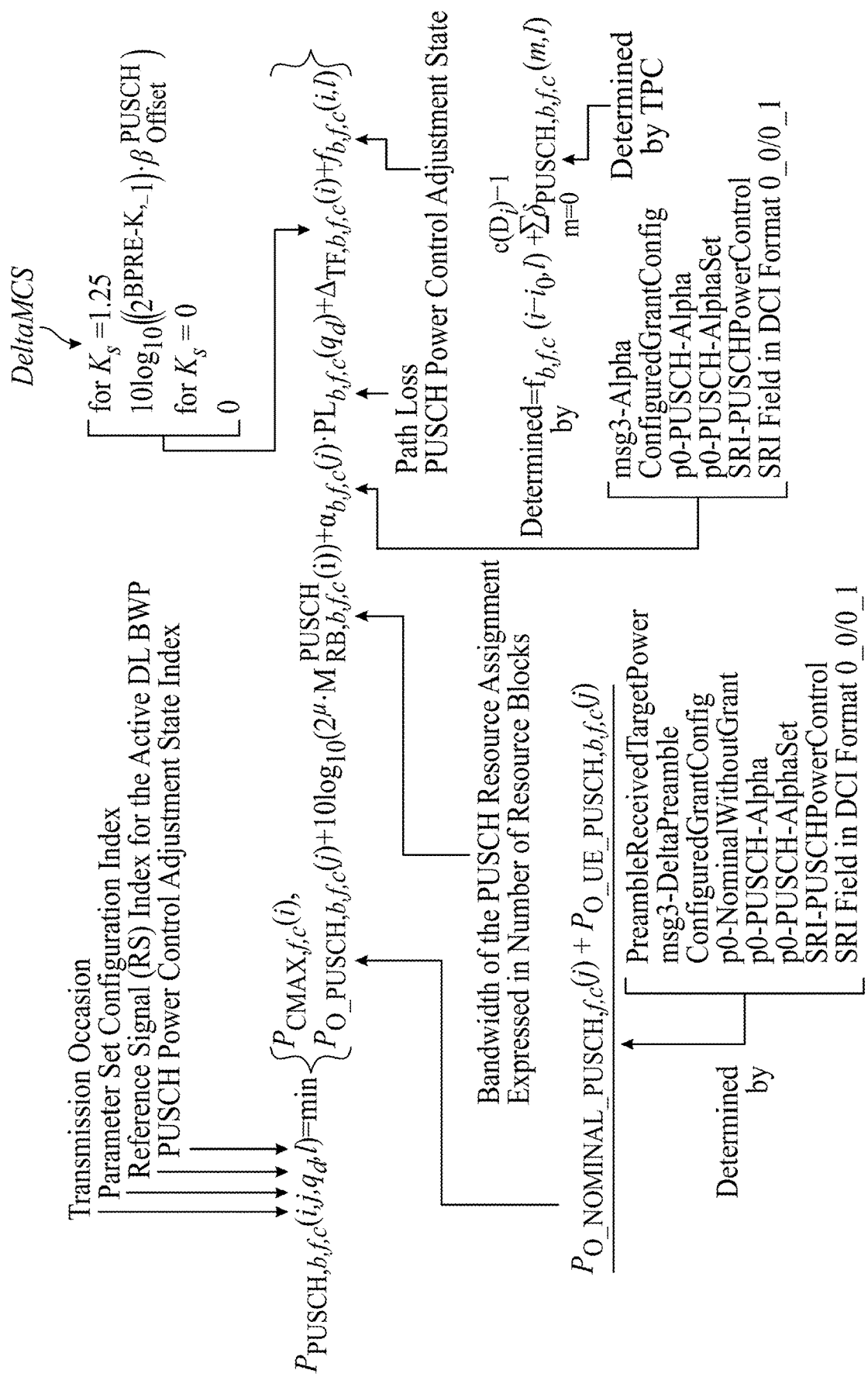
FIG. 11 is an example power control configuration equation for physical uplink shared channel (PUSCH), in accordance with certain aspects of the present disclosure.

Formulas for power control of the communications with the network may be hard-coded for a UE (e.g., a NR Rel-15/16 UE). For example, FIG. 10 illustrates an example power control formula for PRACH transmissions and describes various parameters, while FIG. 11 illustrates an example power control formula for PUSCH transmissions and describes various parameters and dependency on other messages (e.g., Msg1 and Msg3). In some cases, the number and/or range of parameters used for power control may be indicated by system information and/or dedicated RRC signaling.

SDT can be used by devices, such as a reduced capability (RedCap) UE and/or a premium UE to achieve power saving and signaling overhead reduction. Both contention-based and contention-free SDT can be supported in NR Rel-17 and beyond.

When an SDT attempt fails, a UE can select one or more procedures for SDT re-transmission. Such procedures include, a re-attempt the same type of SDT, a switch to a different type of SDT, payload re-construction for SDT, and/or a request for RRC connection.

Regardless of which procedure is used, SDT transmissions and retransmissions (e.g., after a failed SDT transmission) may be improved by considering other signaling and/or parameters related to the SDT and/or the UE. Accordingly, aspects of the present disclosure, provide power control considerations for SDT, for example, using various parameters in a manner designed to improve energy efficiency and spectral efficiency of SDT. Further, certain aspects may provide accommodations for different UE types/capabilities, different contention status(es), and/or different SDT retransmission situations.

Figure 12:
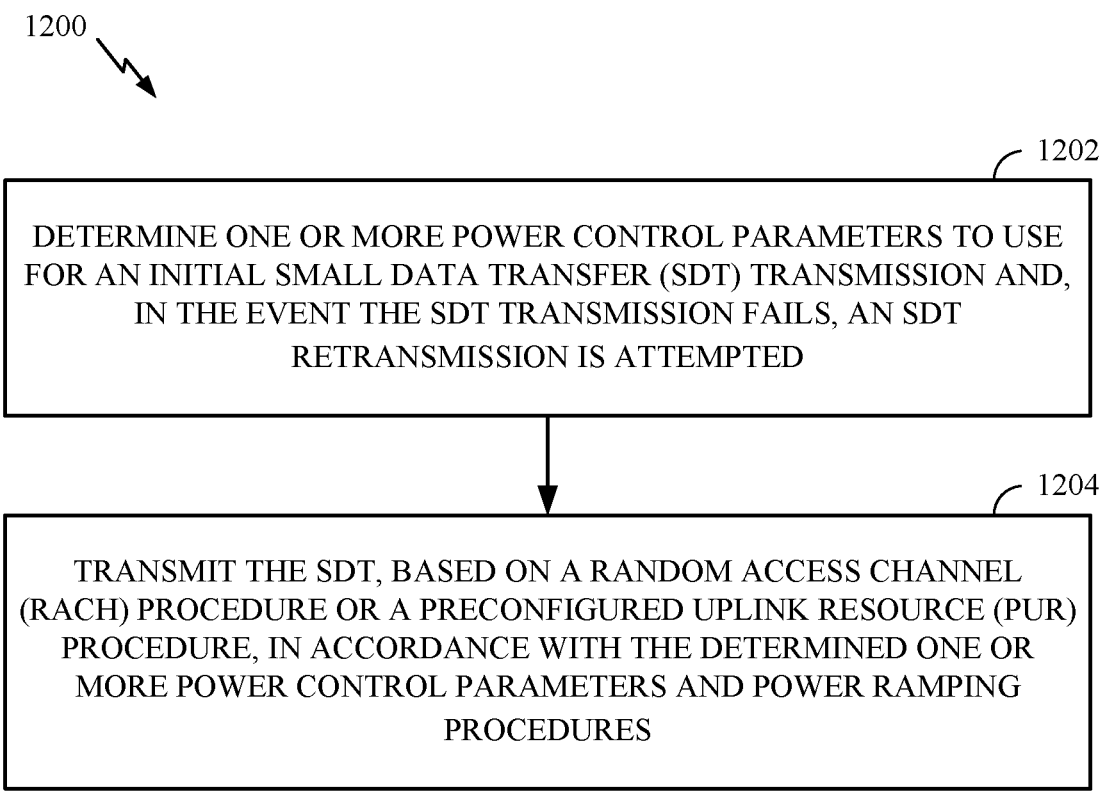
FIG. 12 illustrates example operations for wireless communication by a UE, in accordance with certain aspects of the present disclosure.

FIG. 12 is a flow diagram illustrating example operations 1200 for wireless communication, in accordance with certain aspects of the present disclosure. The operations 1200 may be performed, for example, by a UE (e.g., such as a UE

120a in the wireless communication network 100) to control power for SDT transmissions.

Operations 1200 begin, at 1202, by determining one or more power control parameters to use for an initial small data transfer (SDT) transmission and, in the event the SDT transmission fails, an SDT retransmission is attempted. At 1204, the UE transmits the SDT, based on a random access channel (RACH) procedure or a preconfigured uplink resource (PUR) procedure, in accordance with the determined one or more power control parameters and power ramping procedures.

Figure 13:
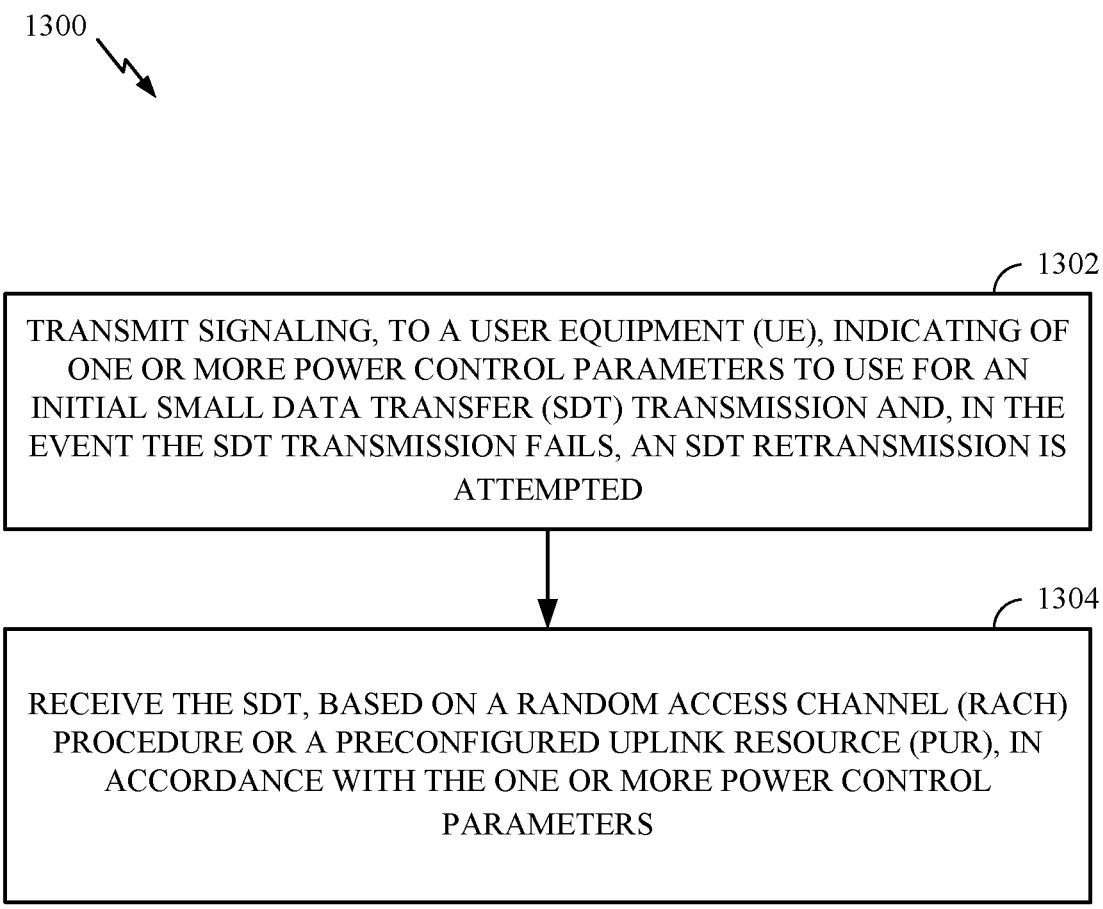
FIG. 13 illustrates example operations for wireless communication by a network entity, in accordance with certain aspects of the present disclosure.

FIG. 13 is a flow diagram illustrating example operations 1300 for wireless communication by a network entity and may be considered complementary to operations 1200 of FIG. 12. For example, operations 1300 may be performed by a BS 110 to control power for SDT by a UE performing operations 1200 of FIG. 12.

Operations 1300 begin, at 1302, by transmitting signaling, to a user equipment (UE), indicating of one or more power control parameters to use for an initial small data transfer (SDT) transmission and, in the event the SDT transmission fails, an SDT retransmission. At 1304, the network entity receives the SDT, based on a random access channel (RACH) procedure or a preconfigured uplink resource (PUR), in accordance with the one or more power control parameters.

The particular power control applied to a particular SDT transmission may depend on a number of factors, such as what type of SDT transmission (RACH procedure-based or PUR-based) and whether the SDT is an initial SDT transmission or an SDT retransmission.

As an example, the UE may apply OLPC to the first transmission of SDT, regardless of whether the SDT is based on a RACH procedure or PUR. If the SDT is performed by an RRC idle UE during initial access (e.g., during a 4-step RACH or 2-step RACH), the power control parameters for PRACH and PUSCH are broadcast in system information (SI).

Power class or power headroom may also be a consideration and the UE may provide information to the network to consider. A power class (e.g., class 1, class 2, class 3 and class 4) may define parameter, such as minimum peak (Effective Isotropic Radiated Power) EIRP and maximum output power limits. In some cases, the UE is configured to multiplex its power class or power headroom report (PHR) with the SDT in PUSCH (e.g., via msg3, msgA, or PUR). The UE could also indicate its power class by PRACH, demodulation reference signal (DMRS) resource selection, UCI multiplexing, and/or PUSCH scrambling identifier (ID). If the SDT is performed by an RRC inactive UE, the power control parameters for PRACH and PUSCH can be either broadcast in SI (e.g., during a 4-step RACH or 2-step RACH), or unicast in dedicated RRC signaling (e.g., PUR).

For PUR based SDT, transmit power control commands (TPC) can be transmitted in a PUR response message. In this case, the UE may apply CLPC for subsequent SDT, for example, based on a TPC in the PUR response message. In some cases, the PUR response message can be mapped to PDCCH, or to both the PDCCH and PDSCH. In some cases, the TPC can be multiplexed with a timing advance command and/or with a transmission configuration indicator (TCI) state (if any).

In some cases, how power control is performed may depend on what resources are allocated for RACH-based and/or PUR-based SDT transmissions.

In certain aspects, when RACH occasions or PUSCH occasions are separately configured in time/frequency (e.g., by time division multiplex (TDM) or frequency division multiplex (FDM)) for different types of SDT (e.g., contention-based or contention-free; RACH based or PUR based), different UE capabilities, different UL coverage extension levels, and/or power control parameters for PRACH and PUSCH can be separately configured. In such cases, configured capabilities, levels and/or parameters may include:
 1) A scaling factor for spectral efficiency of SDT (e.g., bits per resource element (BPRE) or $\beta_{offset}^{PUSCH}$);
 2) Transmission power offset between PRACH and PUSCH for RACH-based SDT;
 3) A pathloss compensation factor;
 4) Configured UE transmit power;
 5) Nominal UE transmit power;
 6) Power ramping (e.g., a step size or a counter);
 7) Waveform type (e.g., cyclic prefix orthogonal frequency division multiplexing (CP-OFDM), discrete Fourier transform spread orthogonal frequency division multiplexing (DFT-s-OFDM), or PRT-based); and/or
 8) Reference signal (RS) resource IDs (e.g., synchronization signal block (SSB), tracking RS (TRS), channel state information (CSI) RS, received signal strength (RSS), and/or positioning reference signal (PRS)) and/or RS received power (RSRP) filtering parameters for pathloss estimation.

When RACH (or PUSCH) occasions are shared in time/frequency resources between different types of SDT, different UE capabilities and/or different UL coverage extension levels the same set of power control parameters could be used for PRACH (or PUSCH) occasions.

In certain aspects, when an SDT attempt fails, the UE can re-attempt the same type of SDT, switch to a different type of SDT, reconstruct the SDT payload, and/or request for RRC connection, based on one or more pre-configured rule(s). In this case, the one or more rule(s) may be determined by a standard and/or the network.

In some cases, the UE can reselect the PRACH and/or PUSCH resources for the SDT retransmission. For example, the resources may be reselected if the retransmission is not triggered by a grant issued by gNB. Further, the UE can switch the transmission spatial filter in the SDT retransmission, for example, if the UE has the capability of transmission beam sweeping.

Power ramping steps are used in incremental power ramping, a power control procedure with memory of the previous power ramping configuration, where UE adds TPC (can be positive or negative) on top of the previous power ramping step. In contrast, absolute power ramping is a power control procedure without memory of the previous power ramping configuration, where UE resets the power ramping step and makes it equal to the TPC.

In certain aspects, the UE's power ramping counter can be suspended in SDT retransmission for a number of reasons. For example, the power ramping counter may be suspended (e.g., for the SDT retransmission) when the UE:
 1) switches to a different transmission spatial filter;
 2) switches to a different coverage extension level;
 3) reaches its maximum transmission power configuration;
 4) switches to a different bandwidth part (BWP); and/or
 5) reconstructs the payload of the SDT into a new payload size.

In some cases, the UE's power ramping counter can continue to increase in SDT retransmission (if not suspended) when the UE switches to a different SDT type (e.g., based on preconfigured rule of network), and/or a power offset can be applied to the SDT retransmission. In some cases, the power offset may be based on a power ramping step size of the new SDT type and/or an updated counter value for power ramping.

Figure 14:
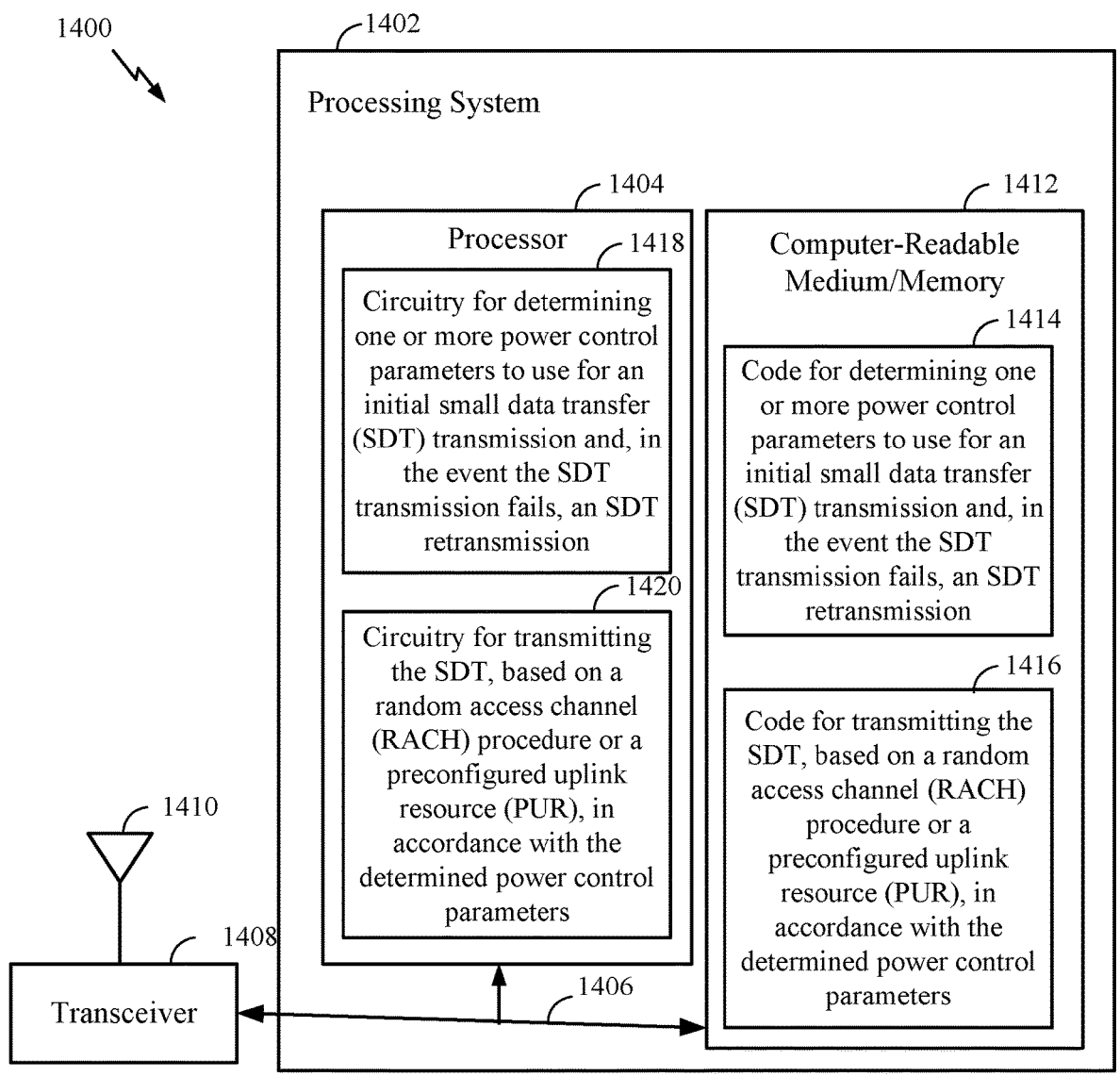
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 12. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/ memory 1412 is configured to store instructions (e.g., computer-executable code) that when executed by the processor 1404, cause the processor 1404 to perform the operations illustrated in FIG. 12, or other operations for performing the various techniques discussed herein. In certain aspects, computer-readable medium/memory 1412 stores code 1414 for determining one or more power control parameters to use for an initial SDT transmission and, in the event the SDT transmission fails, an SDT retransmission; and code 1416 for transmitting the SDT, based on a RACH procedure or a PUR, in accordance with the determined power control parameters. In certain aspects, the processor 1404 has circuitry configured to implement the code stored in the computer-readable medium/memory 1412. The processor 1404 includes circuitry 1418 for determining one or more power control parameters to use for an initial SDT transmission and, in the event the SDT transmission fails, an SDT retransmission; and circuitry 1420 for transmitting the SDT, based on a RACH procedure or a PUR, in accordance with the determined power control parameters.

Figure 15:
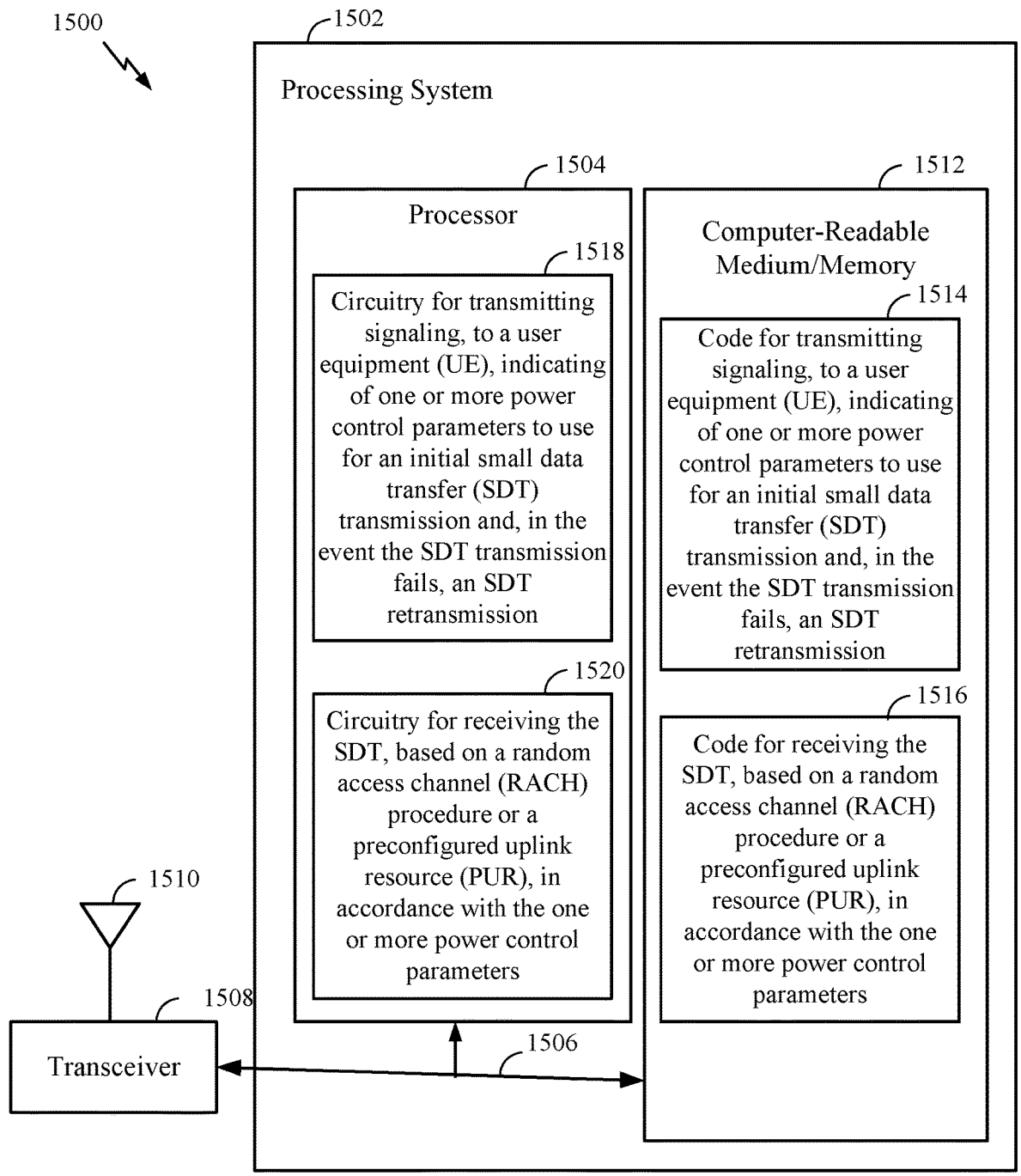
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 13. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/ memory 1512 is configured to store instructions (e.g., computer-executable code) that when executed by the processor 1504, cause the processor 1504 to perform the operations illustrated in FIG. 13, or other operations for performing the various techniques discussed herein. In certain aspects, computer-readable medium/memory 1512 stores code 1514 for transmitting signaling, to a user equipment (UE), indicating of one or more power control parameters to use for an initial small data transfer (SDT) transmission and, in the event the SDT transmission fails, an SDT retransmission; and code 1516 for receiving the SDT, based on a random access channel (RACH) procedure or a preconfigured uplink resource (PUR), in accordance with the one or more power control parameters. In certain aspects, the processor 1504 has circuitry configured to implement the code stored in the computer-readable medium/memory 1512. The processor 1504 includes circuitry 1518 for transmitting signaling, to a UE, indicating of one or more power control parameters to use for an initial SDT transmission and, in the event the SDT transmission fails, an SDT retransmission; and code 1520 for receiving the SDT, based on a RACH procedure or a PUR, in accordance with the one or more power control parameters.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing.

The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 12 or 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation and details of the methods and apparatus described above without departing from the scope of the claims.

The invention claimed is:

1. An apparatus for wireless communications by a user equipment (UE), comprising:
   a memory comprising instructions; and
   one or more processors configured to execute the instructions and cause the apparatus to:
      determine one or more power control parameters to use for an initial small data transfer (SDT) transmission and, in an event the SDT transmission fails, an SDT retransmission is attempted; and
      transmit the SDT to a base station, based on a random access channel (RACH) procedure or a preconfigured uplink resource (PUR) procedure, in accordance with the determined one or more power control parameters and power ramping procedures.

2. The apparatus of claim 1, wherein:
   the small data can originate from user plane or control plane of the UE; and
   the determination is to apply open-loop power control (OLPC) parameters for the initial SDT transmission, regardless of whether the initial SDT transmission is based on a RACH procedure or PUR procedure.

3. The apparatus of claim 1, wherein the determination is to use power control parameters broadcast in system information (SI) if the SDT is transmitted via a RACH procedure while the UE is in a radio resource control (RRC) idle or inactive state.

4. The apparatus of claim 1, wherein:
   the determination is based, at least in part, on at least one of a power class of the UE or a power headroom report (PHR); and
   the one or more processors are further configured to execute the instructions and cause the apparatus to provide an indication of the power class or PHR to the base station for rate adaptation or power control.

5. The apparatus of claim 4, wherein the indication is provided by:
   multiplexing the power class or PHR with a payload of SDT in a physical uplink shared channel (PUSCH);
   indicating the power class or PHR by physical random access channel (PRACH) association or demodulation reference signal (DMRS) resource selection; or
   multiplexing the power class or PHR with uplink control information (UCI); or
   a PUSCH scrambling ID.

6. The apparatus of claim 1, wherein, if the SDT is transmitted while the UE is in a radio resource control (RRC) inactive state, the determination is to use:
   power control parameters broadcast in system information (SI) or unicast in dedicated RRC signaling if the SDT is transmitted via a RACH procedure; or
   power control parameters broadcast or unicast in downlink control information or dedicated RRC signaling if the SDT is transmitted via a RACH procedure or a PUR procedure.

7. The apparatus of claim 1, wherein, if the SDT is transmitted via a PUR, the determination is based at least on a transmission power control command (TPC) signaled in a PUR response message or a random access response message (RAR); and
   the TPC signal can be an incremental or an absolute power ramping command, wherein the PUR response message or the random access response message is mapped to at least one of a physical downlink control channel (PDCCH) or physical downlink shared channel (PDSCH).

8. The apparatus of claim 7, wherein the one or more processors are further configured to execute the instructions and cause the apparatus to: apply closed loop power control (CLPC) for an SDT retransmission, based on the TPC signaled in the PUR response message or the random access response (RAR) message;
   the TPC signal can be an absolute power ramping command if the same transport block or the same transport block size is retransmitted; and
   the TPC signal can be an incremental power ramping command if a different transport block or transport block size is retransmitted.

9. The apparatus of claim 7, wherein the TPC is multiplexed with at least one of a timing advance (TA) command or a transmission configuration indicator (TCI) state information.

10. The apparatus of claim 1, wherein:
    different SDT transmission occasions are configured, in at least one of time or frequency, for at least one of different types of SDT transmissions, different UE capabilities, or different uplink coverage extension levels; and
    power control parameters are separately configured for PRACH based on PUR based SDT.

11. The apparatus of claim 10, wherein the power control parameters separately configured for PRACH based on PUR based SDT comprise at least one of:
  a scaling factor for spectral efficiency of SDT;
  a transmit power offset between a PRACH transmission and a physical uplink shared channel (PUSCH) for RACH procedure-based SDT; or
  a pathloss compensation factor.

12. The apparatus of claim 10, wherein the power control parameters separately configured for PRACH based on PUR based SDT comprise at least one of:
  a configured UE transmit power;
  a nominal UE transmit power; or
  one or more power ramping parameters for SDT retransmissions.

13. The apparatus of claim 10, wherein the power control parameters separately configured for PRACH based on PUR based SDT comprise at least one of:
  a waveform type; (CP-OFDM, DFT-s-OFDM, PRT-based); or
  at least one of reference signal (RS) resource IDs or RS received power (RSRP) filtering parameters for pathloss estimation.

14. The apparatus of claim 1, wherein:
  when different SDT transmission occasions are shared, in at least one of time or frequency, between at least one of different types of SDT transmissions, different UE capabilities, or different uplink coverage extension levels, the one or more processors are further configured to execute the instructions and cause the apparatus to: use a same set of power control parameters for different RACH procedure-based on PUR-based SDT occasions.

15. The apparatus of claim 1, wherein, when one SDT transmission attempt fails, the one or more processors are further configured to execute the instructions and cause the apparatus to select at least one of the following procedures for re-transmission:
  a reattempt the same type of SDT;
  switch to a different type of SDT;
  payload re-construction for SDT; or
  request for radio resource control (RRC) connection.

16. The apparatus of claim 1, wherein the one or more processors are further configured to execute the instructions and cause the apparatus to reselect SDT resources for the SDT transmission if an SDT retransmission is not triggered by a network grant.

17. The apparatus of claim 1, wherein the one or more processors are further configured to execute the instructions and cause the apparatus to switch a transmission spatial filter in an SDT retransmission.

18. The apparatus of claim 1, wherein the determination is to suspend a power ramping counter for SDT retransmission when:
  the one or more processors are configured to execute the instructions and cause the apparatus to switch to a different transmission spatial filter;
  the one or more processors are configured to execute the instructions and cause the apparatus to switch to a different coverage extension level;
  the one or more processors are configured to execute the instructions and cause the apparatus to reach a maximum transmission power configuration;
  the one or more processors are configured to execute the instructions and cause the apparatus to switch to a different bandwidth part (BWP); or
  the one or more processors are configured to execute the instructions and cause the apparatus to reconstruct a payload of an SDT into a payload size.

19. The apparatus of claim 1, wherein:
  the determination is to increase a power ramping counter for SDT retransmissions, if not suspended, when the one or more processors are configured to execute the instructions and cause the apparatus to switch to a new SDT type; and
  the one or more processors are further configured to execute the instructions and cause the apparatus to apply a power offset to SDT retransmission, based on at least one of: a power ramping step size of the new SDT type or an updated counter value for power ramping.

20. An apparatus for wireless communications by a network entity, comprising:
  a memory comprising instructions; and
  one or more processors configured to execute the instructions and cause the apparatus to:
    transmit signaling, to a user equipment (UE), indicating of one or more power control parameters to use for an initial small data transfer (SDT) transmission and, in an event the SDT transmission fails, an SDT retransmission is attempted; and
    receive the SDT, based on a random access channel (RACH) procedure or a preconfigured uplink resource (PUR) procedure, in accordance with the one or more power control parameters and power ramping procedures.

21. The apparatus of claim 20, wherein the signaling comprises power control parameters broadcast in system information (SI) if the SDT is to be received via a RACH procedure while the UE is in a radio resource control (RRC) idle or inactive state.

22. The apparatus of claim 20, wherein:
  the one or more processors are further configured to execute the instructions and cause the apparatus to receive an indication of at least one of a power class of the UE or a power headroom report (PHR) for rate adaptation or power control; and
  the indication of the power class or PHR is provided by the UE via:
    multiplexing the power class or PHR with a payload of the SDT in a physical uplink shared channel (PUSCH);
    by physical random access channel (PRACH) association or demodulation reference signal (DMRS) resource selection;
    multiplexing the power class or PHR with uplink control information (UCI); or
    a PUSCH scrambling ID.

23. The apparatus of claim 20, wherein the signaling comprises, if the SDT is received while the UE is in a radio resource control (RRC) inactive state:
  power control parameters broadcast in system information (SI) or unicast in dedicated RRC signaling if the SDT is transmitted via a RACH procedure; or
  power control parameters broadcast or unicast in downlink control information or dedicated RRC signaling if the SDT is transmitted via a RACH procedure or a PUR procedure.

24. The apparatus of claim 20, wherein:
  the signaling comprises a transmission power control command (TPC) in a PUR response message or a random access response message (RAR), wherein the PUR response message or the random access response message is mapped to at least one of a physical downlink control channel (PDCCH) or physical downlink shared channel (PDSCH); and the TPC can be an incremental or an absolute power ramping command wherein the TPC is multiplexed with at least one of a timing advance (TA) command or a transmission configuration indicator (TCI) state information.

25. The apparatus of claim 20, wherein:
different SDT transmission occasions are configured, in at least one of time or frequency, for at least one of different types of SDT transmissions, different UE capabilities, or different uplink coverage extension levels; and
power control parameters are separately configured for PRACH based on PUR based SDT.

26. The apparatus of claim 25, wherein the power control parameters separately configured for PRACH based on PUR based SDT comprise at least one of:
a scaling factor for spectral efficiency of SDT;
a transmit power offset between a PRACH transmission and a physical uplink shared channel (PUSCH) for RACH procedure-based SDT; or
a pathloss compensation factor.

27. The apparatus of claim 25, wherein the power control parameters separately configured for PRACH based on PUR based SDT comprise at least one of:
a configured UE transmit power;
a nominal UE transmit power; or
one or more power ramping parameters for SDT retransmissions.

28. The apparatus of claim 25, wherein the power control parameters separately configured for PRACH based on PUR based SDT comprise at least one of:
a waveform type; (CP-OFDM, DFT-s-OFDM, PRT-based); or
at least one of reference signal (RS) resource IDs or RS received power (RSRP) filtering parameters for path-loss estimation.

29. A method for wireless communications by a user equipment (UE), comprising:
determining one or more power control parameters to use for an initial small data transfer (SDT) transmission and, in an event the SDT transmission fails, an SDT retransmission is attempted; and
transmitting the SDT to a base station, based on a random access channel (RACH) procedure or a preconfigured uplink resource (PUR) procedure, in accordance with the determined one or more power control parameters and power ramping procedures.

30. A method for wireless communications by a network entity, comprising:
transmitting signaling, to a user equipment (UE), indicating of one or more power control parameters to use for an initial small data transfer (SDT) transmission and, in an event the SDT transmission fails, an SDT retransmission is attempted; and
receiving the SDT, based on a random access channel (RACH) procedure or a preconfigured uplink resource (PUR) procedure, in accordance with the one or more power control parameters and power ramping procedures.

* * * * *